May 26, 1964  A. A. SANDERS ETAL  3,134,929
GAS PRESSURE CONTROL MEANS FOR ACCELERATOR SOURCE
Filed July 21, 1960  2 Sheets-Sheet 1
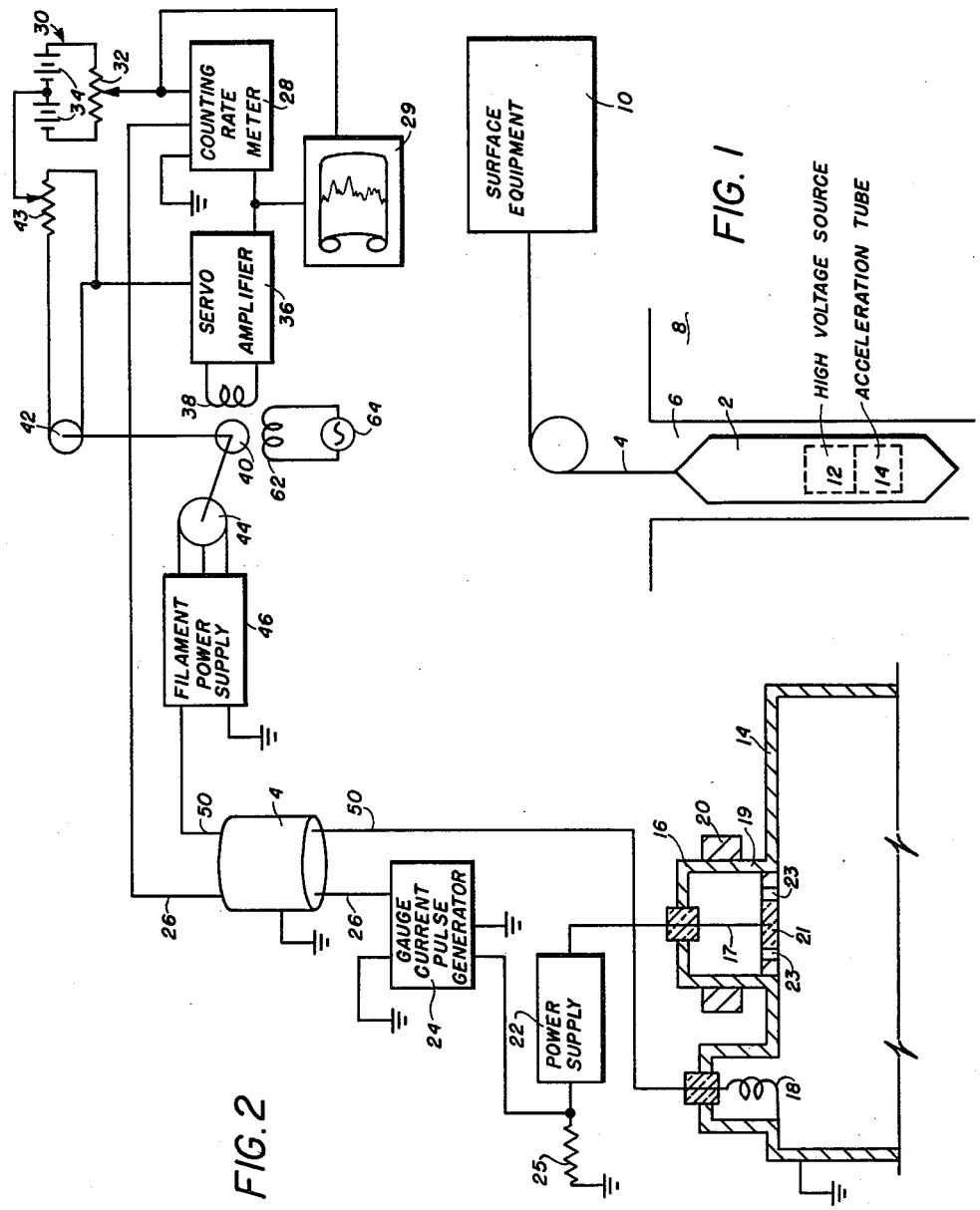
INVENTORS
ANDREW A. SANDERS
ERIC C. HOPKINSON
BY Robert K. Schumacher
ATTORNEY

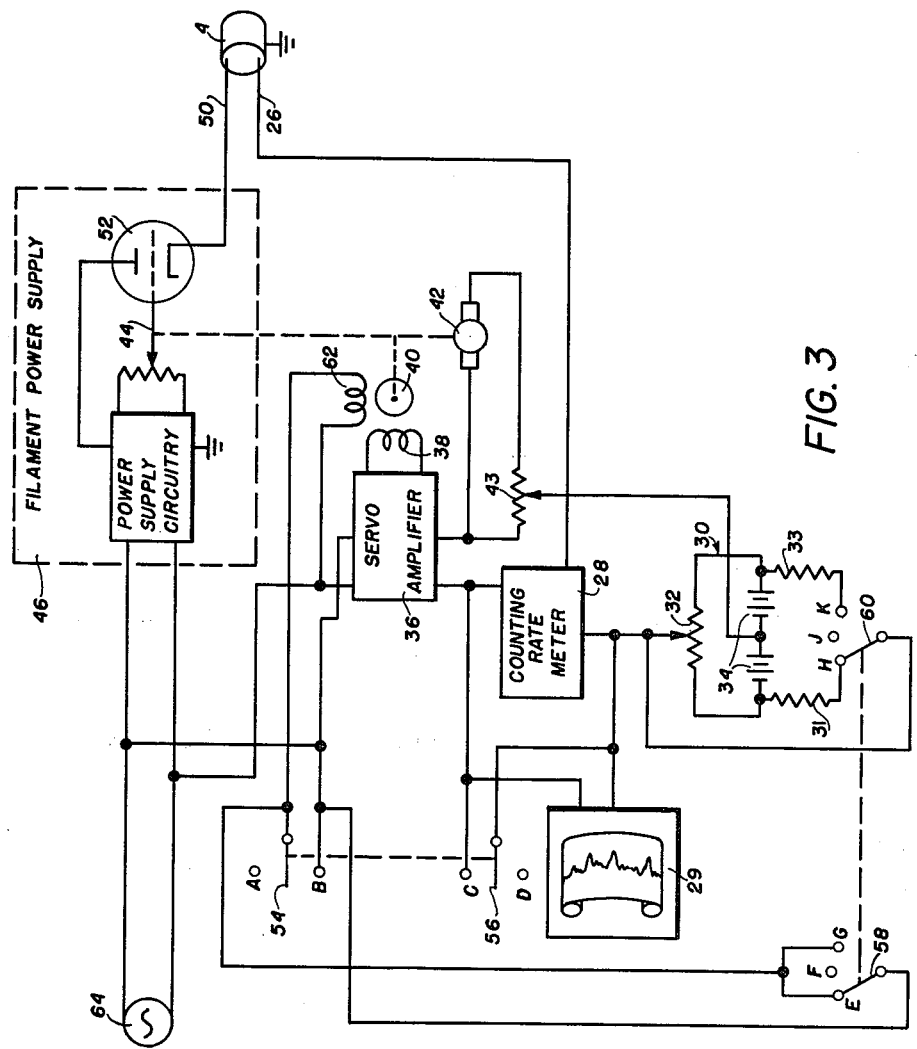

3,134,929
GAS PRESSURE CONTROL MEANS FOR
ACCELERATOR SOURCE
Andrew A. Sanders and Eric C. Hopkinson, Tulsa, Okla.,
assignors to Well Surveys, Inc., a corporation of
Delaware
Filed July 21, 1960, Ser. No. 44,413
5 Claims. (Cl. 315—108)

This invention relates to accelerator type neutron sources and is particularly directed to novel means for controlling the gas pressure of accelerator-type neutron sources employed for nuclear well logging operations.

In the art of nuclear well logging, accelerator-type neutron sources are extremely useful since they produce neutrons of higher energies than are available from capsuled sources containing mixtures of natural elements. Accelerator-type sources frequently employ an acceleration tube filled with deuterium gas and comprising an ion source and a tritium target. The deuterium gas is ionized in the ion source and ions of one polarity are accelerated toward the target to produce the neutrons. In devices of this type, the gas pressure in the acceleration tube is somewhat critical. If the pressure becomes too great, so much current flows that the voltage necessary to cause neutron production is beyond the limits of the power supply. Alternatively, if the gas pressure becomes too low, sparking will occur which will damage the insulation. Accordingly, some means must be provided to regulate the gas pressure in the acceleration tube.

In laboratory accelerators, gas pressure regulation is not too serious a problem since pressurized tanks of gas may be provided in proximity to the accelerator and pumps may be employed to control the gas pressure in the acceleration tube. However, where the accelerator is located in some inaccessible position, for instance, in a subsurface well logging instrument which may be suspended in a borehole several miles below the surface of the earth, the problem becomes acute. Moreover, temperatures as high as 400 degrees Fahrenheit may be encountered in a borehole which makes gas pressure regulation essential.

Numerous methods and apparatus have been proposed heretofore to provide gas pressure regulation for borehole accelerators. However, none of the prior art devices has been entirely satisfactory. Many of the prior art devices have been capable of adding gas in the event the pressure becomes too low but have made no provisions for removing excess gas. Other prior art systems have employed complicated and bulky equipment, such as ion pumps, to remove excess gas. However, this type of apparatus takes up considerable space in a well logging instrument and makes the instrument much larger and heavier.

These disadvantages of the prior art are overcome with the present invention and novel means are provided for regulating the gas pressure in the acceleration tube of a borehole accelerator. Applicants' novel means are compact and simple in construction and yet permit either manual or automatic regulation of the gas pressure in the acceleration tube by means of suitable control apparatus conveniently located at the surface of the earth.

In accordance with the present invention, these advantages are preferably attained by providing in the acceleration tube an ionization gauge and a single filament formed of titanium, zirconium or other similar material which will absorb gas when heated to one temperature range and will emit gas when heated to another temperature range, and monitoring the current flowing through through the ionization gauge as an indication of the gas pressure in the acceleration tube. The signal from the monitor is then transmitted to a convenient control point. In well logging instruments, the signal would be transmitted up the cable to the surface of the earth. At the control point, the signal is compared with a reference signal and any difference between the monitor signal and the reference signal is applied to vary the current supplied to the filament to cause the filament to operate either as a gas reservoir or gas sink, as needed, to re-establish the desired gas pressure in the acceleration tube. In accordance with the present invention, both manual and automatic means are provided for controlling the gas pressure.

Accordingly, it is an object of the present invention to provide novel means for regulating the gas pressure in the acceleration tube of a remote accelerator-type neutron source.

Another object of the present invention is to provide novel manual and automatic means for regulating the gas pressure in the acceleration tube of a remote accelerator-type neutron source.

A specific object of the present invention is to provide novel means for regulating the gas pressure in the acceleration tube of a remote accelerator-type neutron source, said means comprising an ionization gauge mounted in said acceleration tube, a filament formed of a material which will absorb gas when heated to one temperature range and emit gas when heated to another temperature range also mounted in said acceleration tube, monitor means for continuously measuring the electrical current flowing through said ionization gauge as an indication of the gas pressure in said acceleration tube, means establishing an electrical signal indicative of the gas pressure measured by said monitor means, means for transmitting said electrical signal to a control point, means establishing a reference signal, means for comparing said electrical signal with said reference signal, means supplying electrical current to said filament to cause said filament to absorb or emit gas, and means responsive to any difference between said electrical signal and said reference signal to vary the electrical current supplied to said filament to re-establish the desired gas pressure in said acceleration tube.

These and other objects and features of the present invention will be apparent from the following detailed description wherein reference is made to the figures of the accompanying drawings.

In the drawings:

FIG. 1 is a diagrammatic representation of typical nuclear well logging apparatus embodying the present invention;

FIG. 2 is a diagrammatic representation of the gas pressure control system of the apparatus of FIG. 1; and FIG. 3 is a diagrammatic representation of a modified form of the gas pressure control system of FIG. 2.

In those forms of the invention chosen for purposes of illustration in the drawings, FIG. 1 shows a subsurface well logging instrument 2 suspended by means of a cable 4 in a borehole 6 penetrating the earth 8. The cable 4 contains one or more electrical conductors and provides electrical connection between the subsurface instument 2 and suitable surface equipment 10 located at the surface of the earth. When an accelerator-type neuton source is employed, the source is contained in the subsurface instrument 2 and comprises a high voltage source, indicated in dotted lines at 12, and an acceleration tube, indicated at 14. Typically, the acceleration tube 14 has an ion source and a target which contains tritium. In addition, the acceleration tube is filled with a deuterium at low pressure. Mechanically the acceleration tube 14 may be similar to that shown and described in U.S. Patent No. 2,689,918 issued September 14, 1954, to Arthur H. Youmans for "Static Atmosphere Ion Accelerator for Well Logging."

When the subsurface instrument is suspended in a borehole, it may be subjected to temperatures as high as 400 degrees Fahrenheit. As indicated above, temperatures of this magnitude may substantially alter the pressure in the acceleration tube and may vary the operating conditions of the tube or actually render the tube inoperative. Since the borehole may extend several miles below the surface of the earth, it is obviously impossible to measure and adjust the gas pressure in the acceleration tube directly. To overcome this problem, the circuit of FIG. 2 may be employed.

As seen in FIG. 2, the acceleration tube 14 is provided with an ionization gauge 16 and a filament 18. The ionization gauge 16 comprises an anode 17 and a cylindrical cathode 19 surrounded by magnets 20. One end of the anode 17 is supported by an insulator 21 having openings 23 formed therethrough to permit gas from the acceleration tube 14 to enter the ionization gauge 16. Ionization gauge 16 is energized by a suitable power supply 22 which is isolated from ground by a suitable resistor 25. Current passing through the ionization gauge 16 is converted by pulse converter 24 to a pulse type signal having a repetition rate which is functionally related to the value of the ionization gauge current. The pulse converter 24 may comprise a conventional phantastron circuit. Since this current is a function of the gas pressure in the acceleration tube 14, the repetition rate of the signal from converter 24 provides an indication of the pressuer in the acceleration tube 14. The signal from converter 24 is then transmitted by suitable means, such as conductor 26 of cable 4, to a convenient control point which may be included in the surface equipment 10 of FIG. 1.

At the surface, the signal from converter 24 is applied to a counting rate meter 28 which puts out a direct current signal (which may be a current or a voltage) having a value which is proportional to the repetition rate of the signal from converter 24. The current from counting rate meter 28 is applied to a suitable comparison circuit 30 where it is compared across resistor 32 with the current from reference sources 34 or the like. Resistor 32 is preferably variable and may be adjusted to vary the balance point of the comparison circuit 30. If desired, resistor 32 may be calibrated in terms of acceleration tube gas pressure for convenience.

When the current from counting rate meter 28 is exactly equal to that from reference sources 34, no current will flow from comparison circuit 30. However, if the current from counting rate meter 28 is any other value, some current will flow from the comparison circuit 30 to the servo amplifier 36 where it is amplified and supplied to the control winding 38 of a two-phase motor 40. The other winding 62 of motor 40 is supplied with power from power source 64. Motor 40 is preferably coupled to a tachometer generator 42 which supplies a feedback current through potentiometer 43 to the servo amplifier 36 to prevent overcompensation and insure stability for the circuit. Motor 40 drives a suitable potentiometer 44 in accordance with the signal applied to control winding 38 to increase or decrease the output of the filament power supply 46. The output of power supply 46 is transmitted over conductor 50 of the cable 4 to the subsurface instrument where it is applied to the filament 18.

As indicated previously, filament 18 is preferably formed of zirconium, titanium or the like. These metals will absorb deuterium and tritium gas when the metals are relatively cool and will allow the gases to escape when the metals are relatively hot. Accordingly, by increasing the current through filament 18, the temperature of the filament may be raised to allow gases to escape from the filament metal and, thus, raise the gas pressure in the acceleration tube 14. Conversely, by decreasing the current through filament 18, the temperature of the filament may be lowered to cause the filament metal to absorb gases and, thus, reduce the gas pressure in the acceleration tube 14.

In some instances, it may be desirable to record an indication of the gas pressure in the acceleration tube 14. This may easily be accomplished by connecting a suitable recorder 29 across the outputs of the counting rate meter 28, as shown in FIG. 2.

To illustrate the operation of the apparatus of the present invention, let us assume that the gas pressure in the acceleration tube 14 has risen above the desired value. When this occurs, the current through ionization gauge 16 rises causing a corresponding increase in the repetition rate of the pulse signal from converter 24. This pulse signal is transmitted to the surface by conductor 26 of cable 4 and is applied to counting rate meter 28 where the increased repetition rate causes a proportional increase in the current applied to the comparison circuit 30. Comparison circuit 30 finds that the current from counting rate meter 28 exceeds the value of the current from reference sources 34 and, consequently, applies the difference between these currents to the servo amplifier 36. The difference signal is then amplified and applied to the control winding 38 of motor 40. In response to this, motor 40 adjusts the setting of potentiometer 44 to reduce the output of power supply 46. The reduced signal is then transmitted over conductor 50 of cable 4 to the subsurface instrument and is applied to filament 18. Reducing the current through the filament 18 lowers the temperature of the filament, thereby causing the filament metal to absorb gas from the acceleration tube 14 and thereby lowering the gas pressure in the acceleration tube 14.

In some instances, it may be desirable to provide means for manually adjusting the gas pressure in the acceleration tube. To accomplish this, the circuit of FIG. 3 may be employed. The subsurface apparatus employed with the circuit of FIG. 3 is identical with that of FIG. 2 and, hence, is not shown. For automatic operation, the circuit of FIG. 3 is substantially identical with that of FIG. 2. Thus, a pulse type signal from the subsurface instrument is transmitted up conductor 26 of the cable 4 and the repetition rate of this signal indicates the gas pressure in the acceleration tube, as described above in connection with FIG. 2. This pulse type signal is supplied to the counting rate meter 28 which converts the signal to a direct current having an amplitude proportional to the repetition rate of the pulse signal. The direct current is applied to the comparison circuit 30 where it is compared across resistor 32 with the reference signal from reference sources 34. Any difference between the direct current signal from counting rate meter 28 and the reference signal is applied to the servo amplifier 36 which amplifies the difference signal and supplies it to control winding 38 of the two-phase motor 40. Motor 40 drives the potentiometer 44 to regulate the grid voltage of amplifier 52 which is in the output stage of the filament power supply 46. This controls the current transmitted by conductor 50 of the cable 4 which, as seen in FIG. 2, supplies filament 18 to regulate the gas pressure in the acceleration tube.

In some instances, it may be desirable to adjust the gas pressure manually. To accomplish this, a manual override system is included in the circuit of FIG. 3. The override system serves to short circuit the output of the counting rate meter 28 and to permit the full reference signal from reference sources 34 to be applied to increase or decrease, as desired, the current supplied to filament 18 in the acceleration tube. To accomplish this, two pairs of interlocked switches are provided. Thus, switches 54 and 56 are interlocked and switches 58 and 60 are interlocked. Switch 54 is engageable with either of contacts A and B while switch 56 is engageable with either of contacts C and D. For automatic operation, switch 54 is moved to contact B to complete a circuit which connects the fixed phase winding 62 of motor 40 across the power source 64. At the same time, switch 56 is moved to contact D which is an open contact. For the manual override, switch 56 is moved to contact C which short circuits the output of counting rate meter 28. Also, switch 54 is moved to contact A. Since this contact is open, winding 62 of motor 40 will now be controlled by switch 58. Switch 58 is engageable with any of contacts E, F and G. Contacts E and G both serve to connect winding 62 of motor 40 across the power source 64 while contact F is open. However, switch 58 is interlocked with switch 60 which is engageable with contacts H, J or K. Contacts H and K both serve to apply substantially the full reference signal from reference sources 34 to the servo amplifier through current limiting resistors 31 and 33 respectively. However, the polarity of the signal applied when contact H is engaged is the opposite of that when contact K is applied. Contact J is open. Thus, when switch 60 engages contact J and switch 58 engages contact F, no signal will be applied to servo amplifier 36. If switch 60 is moved to engage contact H, the full reference voltage will be applied to servo amplifier 36. This signal will then be amplified and supplied to winding 38 of motor 40. At the same time, because of the interlocking connection, switch 58 will be moved to engage contact E, thereby connecting winding 62 of motor 40 across power source 64. As a result, potentiometer 44 will be driven to one end of its travel so that maximum current will be transmitted over conductor 50 and the temperature of filament 18 will be raised to rapidly increase gas pressure in the acceleration tube. As long as switch 60 is maintained in engagement with contact H, the gas pressure in the acceleration tube will continue to rise rapidly. When the desired pressure is reached, switch 60 is moved to contact J and switch 58 is moved to contact F. The automatic system may then be connected by switches 54 and 56, so that compensation will be made for pressure changes.

Should it be desirable to reduce the gas pressure manually, the automatic system is disconnected and switch 60 is moved to contact K. This again applies the full reference voltage to the servo amplifier 36 and thence to winding 38 of motor 40. However, the polarity of the reference voltage is opposite to that when contact H was engaged. At the same time, interlocked switch 58 is moved to contact G to energize winding 62 of the motor 40. Consequently, motor 40 moves potentiometer 44 to the opposite end of its travel and a minimum signal is transmitted from power supply 46 over conductor 50 of cable 4 to filament 18. This reduces the temperature of filament 18 and causes the filament to absorb gas from the acceleration tube.

Numerous other variations and modifications may also be made without departing from the present invention. Accordingly, it should be clearly understood that the forms of the invention described above and shown in the figures of the accompanying drawings are illustrative only and are not intended to limit the scope of the invention.

What is claimed is:

1. Apparatus for controlling the gas pressure in the acceleration tube of an ion accelerator contained in a subsurface well logging instrument, said apparatus comprising an ionization gauge communicating with said acceleration tube, converter means for converting the current through said gauge to a pulse type signal, a cable connecting said accelerator to a control point at the surface of the earth, means transmitting said pulse type signal over said cable, counting rate meter means at said control point connected to receive said pulse type signal and to establish a direct current signal functionally related to said pulse type signal, a reference signal source emitting a direct current reference signal, comparison means for comparing said direct current signals and establishing an electrical signal indicative of any difference between said direct current signals, a filament mounted in said acceleration tube and formed of material which will absorb gas when heated to one temperature range and emit gas when heated to another temperature range, a variable output power supply located at said control point and connected to supply current to said filament through said cable, and means responsive to the current from said comparison means for controlling the output of said power supply to cause said filament to regulate the gas pressure in said acceleration tube.

2. Apparatus for controlling the gas pressure in an acceleration tube of an ion accelerator contained in a subsurface well logging instrument, said apparatus comprising a pressure sensing device connected to monitor the pressure in said acceleration tube and establishing an electrical signal indicative of said gas pressure, a control point located at the surface of the earth, a cable electrically connecting said subsurface instrument and said control point, means for converting said signal from said pressure sensing device for transmission over said cable to said control point, a filament mounted in said acceleration tube and formed of a material which will absorb gas when heated to one temperature range and emit gas when heated to another temperature range, and means responsive to said signal for controlling the temperature of said filament to maintain a desired gas pressure in said acceleration tube.

3. Apparatus for controlling the ionizability of gas in an acceleration tube of an ion accelerator contained in a subsurface well logging instrument, said apparatus comprising an ionization gauge connected to monitor the ionizability of the gas in said acceleration tube and establishing an electrical signal indicative of said ionizability, a control point located at the surface of the earth, a cable electrically connecting said subsurface instrument and said control point, means for converting said signal from said ionization gauge for transmission over said cable to said control point, a filament mounted in said acceleration tube and formed of a material which will absorb gas when heated to one temperature range and emit gas when heated to another temperature range, and means responsive to said signal for controlling the temperature of said filament to maintain a desired ionizability in said tube.

4. Apparatus for controlling the gas pressure in an acceleration tube of an ion accelerator contained in a subsurface well logging instrument, said apparatus comprising a pressure sensing device connected to monitor the gas pressure in said acceleration tube and establishing electrical signals indicative of said gas pressure, a control point located at the surface of the earth, a cable electrically connecting said subsurface instrument and said control point, means for converting the signals from said pressure sensing device for transmission over said cable to said control point, a reference signal source, comparison means at said control point for comparing the converted signals from said pressure sensing device with the signals from said reference source and having an output indicative of any difference between said signals, a filament mounted in said acceleration tube and formed of a material which absorbs gas when heated to one temperature range and emits gas when heated to another temperature range, and means responsive to the output of said comparison means for controlling the temperature of said filament to maintain a desired gas pressure in said acceleration tube.

5. Apparatus for controlling the gas pressure in the acceleration tube of a remote ion accelerator, said apparatus comprising an ionization gauge communicating with said acceleration tube, converter means for converting the current through said gauge to a pulse type signal, a cable connecting said accelerator to a remote control point, means transmitting said pulse type signal over said cable, counting rate meter means at said control point connected to receive said pulse type signal and to establish a direct current signal functionally related to said pulse type signal, a reference signal source emitting a direct current reference signal, comparison means for comparing said direct current signals and establishing an electrical signal indicative of any difference between said direct current signals, a filament mounted in said acceleration tube, a variable output power supply located at said remote point and connected to supply current to said filament through said cable, means responsive to the current from said comparison means for controlling the output of said power supply to cause said filament to regulate the gas pressure in said acceleration tube, manually operable means for disconnecting the output of said counting rate meter means, and manually operable means for controlling the output of said comparison means to vary deliberately the current supplied to said filament thereby causing said filament to vary the gas pressure in said acceleration tube in a desired manner.

References Cited in the file of this patent

UNITED STATES PATENTS 2,880,373     Soloway _____ Mar. 31, 1959